(12) United States Patent
Fairchild et al.

(10) Patent No.: US 6,399,544 B1
(45) Date of Patent: Jun. 4, 2002

(54) HIGH SOLIDS BENTONITE SLURRIES AND METHOD FOR PREPARING SAME

(75) Inventors: Peter H. Fairchild; Ian R. Fairchild, both of 4 Peter St., Freelton (CA)

(73) Assignees: Peter H. Fairchild; Ian R. Fairchild, both of Freelton (CA)

( * ) Notice: Subject to any disclaimer, the term of this patent is extended or adjusted under 35 U.S.C. 154(b) by 0 days.

(21) Appl. No.: 09/525,591

(22) Filed: Mar. 15, 2000

Related U.S. Application Data

(60) Provisional application No. 60/124,617, filed on Mar. 16, 1999.

(51) Int. Cl.[7] .............................. C09K 7/06; B01F 3/12; C04B 14/04
(52) U.S. Cl. ...................... 507/100; 507/200; 507/103; 507/203; 516/34; 106/487
(58) Field of Search .................... 516/34; 106/487; 507/100, 200, 103, 203

(56) References Cited

U.S. PATENT DOCUMENTS

| | | | |
|---|---|---|---|
| 4,173,999 A | | 11/1979 | Messenger |
| 4,664,820 A | * | 5/1987 | Magauran et al. ............ 516/34 |
| 5,569,642 A | | 10/1996 | Lin |
| 5,607,901 A | * | 3/1997 | Toups, Jr. et al. .......... 507/103 |
| 5,837,654 A | * | 11/1998 | Carroll et al. .............. 507/100 |
| 5,910,467 A | | 6/1999 | Bragg |
| 5,939,475 A | * | 8/1999 | Reynolds et al. ............. 516/34 |
| 6,130,256 A | * | 10/2000 | Nae ............................. 516/34 |

FOREIGN PATENT DOCUMENTS

| | | | |
|---|---|---|---|
| EP | 0 627 481 A1 | 12/1994 | ............ C09K/7/06 |

OTHER PUBLICATIONS

Database Registry Online Chemical Abstracts RN 72623–86–0, No Date.
ibid.RN 72623–85–9, No Date.
ibid.RN 72623–87–1, No Date.

* cited by examiner

*Primary Examiner*—Philip Tucker
(74) *Attorney, Agent, or Firm*—Ridout & Maybee LLP

(57) ABSTRACT

Pumpable and flowable bentonite clay slurries having a bentonite solids content of about 50% or greater have been prepared for the first time through the use of a non-aqueous fluidizing agent, characterized by being a highly-saturated hydrocarbon oil with low affinity for reactivity with bentonite or other hydrophilic swelling agents such as starches, guars and xanthans. The slurries are useful in the economical transport of bentonite without impairing its swellability in aqueous media in applications such as mining, papermaking and oil drilling.

5 Claims, 4 Drawing Sheets

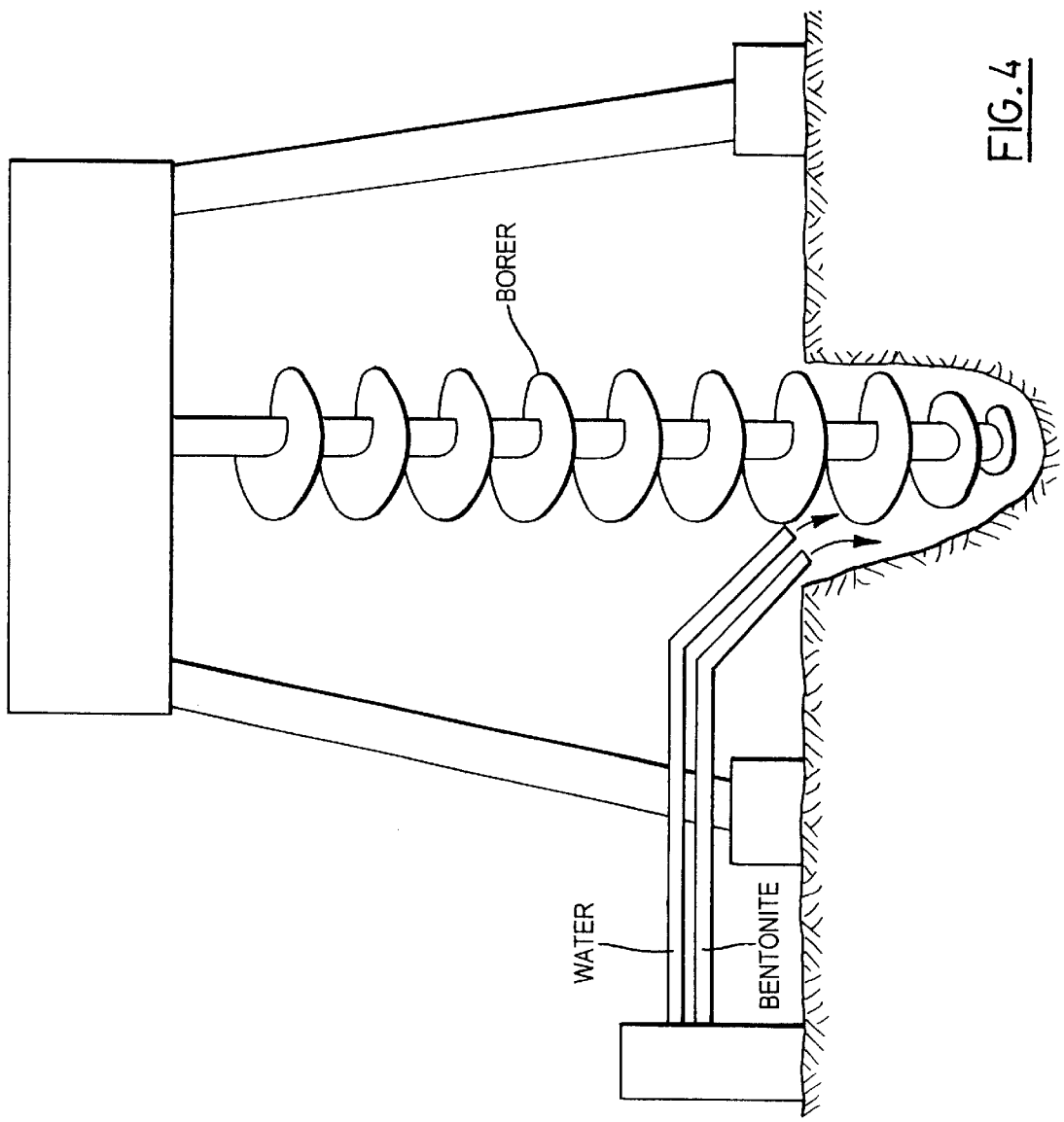

HIGH SOLIDS BENTONITE SLURRIES AND METHOD FOR PREPARING SAME

RELATED APPLICATION

This application replaces provisional application No. 60/124,617, filed on Mar. 16,1999, and entitled SYSTEM FOR PRODUCING HIGH SOLIDS BENTONITE SLURRIES.

BACKGROUND OF THE INVENTION

1. Field of the Invention

This invention relates to the use of non-aqueous fluidizing agents for the preparation of stable, pumpable bentonite clay slurries containing more than 15% to upwards of 50% solids by weight. In slurries made according to the present invention, there is no significant diminution of commercially valuable properties of the bentonite, particularly its application as a thickener in aqueous media.

2. Description of the Prior Art

Bentonite is a generic term of a number of aluminum silicate clay minerals which in native form appear as flakes or sheets, not unlike mica. Structurally, bentonites consist essentially of flat plates of aluminum-oxygen-silicon molecules laminated together like the pages of a book. In contact with water, bentonite swells as it "unleafs". It is believed that a strong electrostatic force between the layers of the mineral draws in the polar liquid water and the sheet-like structure swells up to eight times its original size as water forces itself between the "pages".

Because of their very great water absorbency, bentonites result in a thickening of aqueous media to which they are added, affording a wide number of applications in the fields of paper-making, oil recovery, mining and tunnel formation, agriculture, and drilling muds to name only some major applications.

However, their very property of swelling in water upon which useful applications of bentonites are based, leads to serious problems in the handling, delivery and transportation of bentonite clays. Pumpable aqueous slurries of bentonites do not commonly exhibit a solids content of more than about 7%, above which settling or caking occurs which impairs or destroys the pumpability of the slurry. Not only is the maximum solids content of a pumpable aqueous bentonite slurry only about 7%, but stock aqueous slurries of bentonite must be kept agitated to prevent settling and caking which is very difficult to reverse.

By way of example, in current paper-making operations carried out at paper mill sites, bentonite clay is added to the head box after dilution from a concentration of about 7% solids to about 0.5% solids. This procedure requires significant expertise and care in order to maintain uniform swelling response properties on the paper line. Too, the operation naturally requires a large volume of make-up water. On-site make-up involves considerable space and costly equipment and servicing; a typical fabrication unit in a paper plant costs more than $150,000.

Another illustration of the limitations inherent in the use of aqueous bentonite slurries is afforded by the use of such slurries in field applications, such as tunnel stabilization. Bentonite must be pumped at the site at solids contents of only 1–5%. This has the desired effect of placing the bentonite into selected locations, but "uses up" a significant portion of the total water absorbency of the bentonite clay.

It has been a generally recognized desideratum to provide a suspension medium for bentonite slurries which itself is of high fluidity (therefore permitting enhanced bentonite solids content) but which does not interfere with the desired end-use subsequent swelling of bentonite by water. As noted above, as a carrier any aqueous medium causes swelling and uses up some of the absorbency.

A number of approaches are known which seek to resolve this problem through the addition of any of a wide variety of additives or processing stages. While some of these approaches have resulted in the preparation of higher solids slurries—up to about 15% bentonite solids—they generally increase costs considerably and usually harm subsequent use of the bentonite as a thickener. Additionally, the control of the swelling process is often not reproducible from batch to batch and problems of settling and caking are still present.

Attempts have been made to use non-aqueous fluids as carriers of the mineral, but these often brought their own problems such as flammability, toxicity, or interference with the commercial process in which bentonite serves as the thickener, e.g. paper-making. Some likely candidates as carriers proved useless because of almost instantaneous interaction with the bentonite to cause gelling or solidification of the mixture.

SUMMARY AND OBJECTS OF THE INVENTION

In our efforts to find a useful non-aqueous fluidizer which would allow the preparation of high solids, pumpable bentonite slurries, we concluded that, at the minimum, the following conditions should prevail:

(i) the fluidizing agent should be "inert" in the sense of minimal physical-chemical interactions between the fluid and the bentonite;

(ii) the fluidizing agent should not interfere with the normal and intended operation of the bentonite (retention, formation, pitch removal, viscosity increase, lubrication, etc);

(iii) the fluidizing agent should not be toxic or otherwise hazardous for use in the intended application of the mineral, e.g. in paper mills;

(iv) the fluidizing agent should allow slurries of significantly more than 15% bentonite solids to be prepared; and (v) the fluidizing agent should be readily available at relatively low cost to permit its widespread use.

A particularly preferred fluid is highly saturated lubricating oil that has been subjected to repeated hydrogenation steps to produce an oil having a degree of saturation of about 95% or greater. An example of such an oil is M-65, CAS [chemical abstract services] No. 72623-86-0, which is a mixture of hydrotreated hydrocarbons containing 15 to 30 carbon atoms, CAS No. 72623-95-9, which is a mixture of hydrotreated hydrocarbons containing 20 to 50 carbon atoms, and CAS No. 72623-87-1, which is a mixture of hydrotreated hydrocarbons containing 20 to 50 carbon atoms.

The lubricating oil having CAS No. 72634-86-0 is obtained by treating light vacuum gas oil and heavy vacuum gas oil with hydrogen in the presence of a catalyst in a two stage process with dewaxing being carried out between the two stages. It consists essentially of hydrocarbons containing 15 to 30 carbon atoms. The lubricating oils having CAS No. 72623-85-0 and 72623-87-1 are obtained by treating light vacuum gas oil, heavy vacuum gas oil and deasphalted residual oil with hydrogen in the presence of a catalyst in a two stage process with dewaxing being carried out between the two stages. It consists essentially of hydrocarbons containing 20 to 50 carbon atoms.

With a view to achieving the objects and overcoming the problems aforementioned, the present invention provides according to one aspect thereof a high-solids, pumpable bentonite slurry which comprises a fluidizing agent consisting essentially of one or more hydrocarbon oils exhibiting a high degree of saturation, mixed with from about 15 to upwards of 50% by weight of bentonite clay.

According to another aspect of the invention, there is provided a method for preparing a high-solids pumpable and flowable bentonite slurry by stirring particulate bentonite clay into a non-aqueous fluidizing agent to a content of greater than about 50% bentonite solids, where the fluidizing agent consists essentially of highly saturated hydrocarbon oils of from 15 to 50 carbon atoms per molecule.

BRIEF DESCRIPTION OF THE DRAWINGS

Preferred embodiments and applications of the invention will hereinafter be described with reference made to the drawings, in which:

Drawing 1 is a schematic illustration of use of high-solids bentonite slurries according to the invention to isolate an area in which pit mining operations are carried out, controlling seepage of ground water into the pit;

Figure 1:
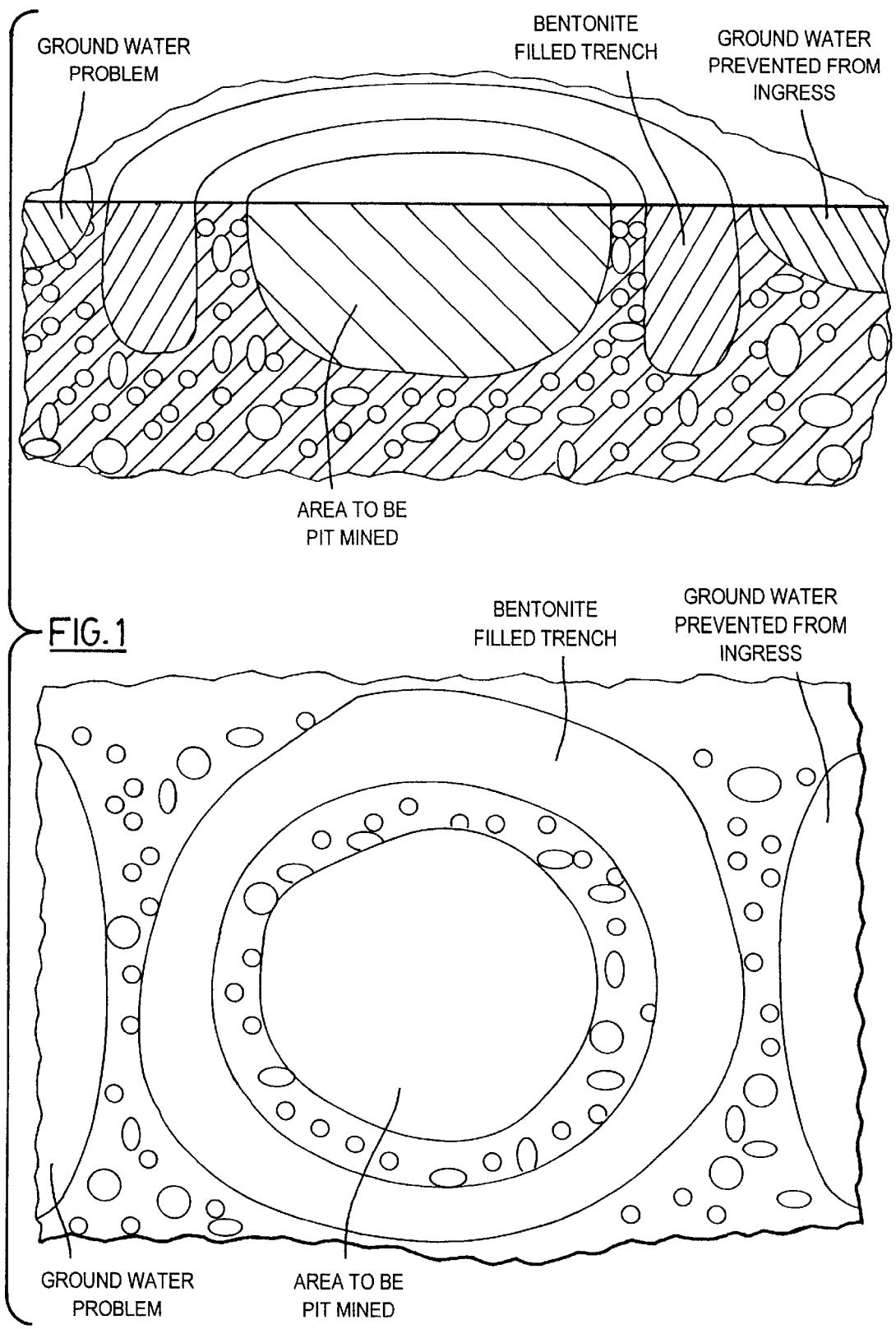

Drawing 2 is a schematic representation of the use of bentonite slurries according to the present invention in the recovery of petroleum from a subterranean pool of oil;

Drawings 3a and 3b schematically illustrate the use of slurries according to the present invention to provide bentonite solids for the stabilization of soil in tunneling applications, such as subway construction; and Drawing 4 schematically illustrates the use of pumpable bentonite slurries according to the present invention to assist in the recovery of oil in a drilling operation, comprising the drilling mud.

BRIEF DESCRIPTION OF THE PREFERRED EMBODIMENT

A number of potential candidates among non-aqueous organic fluids were tested for ability to carry high levels of bentonite clays in stable dispersion. We found that even some of the nominally "inert" or "saturated" oils which were available exhibited high interaction with bentonite that precluded their use for the desired application.

One particular commercially available oil was found to yield remarkably superior results, namely the saturated oil referred to as M-65 in the experimental examples given below, as well as mixtures of this oil with a minor proportion of oil M-FTS-365 as additive.

We concluded that good results were obtainable, where a hydrocarbon oil was saturated to the highest degree possible through a series of hydrogenation steps to achieve a degree of saturation of 95% or greater. This degree of hydrogen saturation may be measured by monitoring of physical properties or by chemical measurement of the "Iodine Number", long used to determine the level of residual unsaturation in hydrocarbons.

What we have found to be of critical importance, however, is that the "saturation" not be achieved by the addition to hydrocarbon double bonds of functional groups or constituents other than hydrogen itself; such added functionalities typically exhibit a strong surface reactivity on bentonite clays and do not yield "bentonite inert" fluids.

The material that has shown the best effect upon fluidizing bentonites is a "severely" saturated lubricating oil via severe sequential hydrogenation steps having a degree of saturation of about 95%, or greater. It is recognized under CAS number 72623-86-0, being primarily composed of hydrocarbons containing 18–23 carbons. The viscosity of the oil is quite low at 8.9 cst (at 40° C.) and 2.5 cst (at 100° C.). This is marketed by Merlyn Coatings & Chemicals under the name M65.

EXAMPLE 1

Use of Various Fluids as Bentonite Fluidizers

| FLUID | BENTONITE | MAXIMUM BENTONITE % |
|---|---|---|
| mineral seal oil | sodium bentonite O* | 7 |
| dibutyl phthalate plasticizer | " | 10 |
| motor oil | " | 10–12 |
| mineral spirits solvent | " | settles |
| mineral oil B | " | 13 |
| water | " | 5 |
| water containing salt | " | 7 |
| aqueous zinc salt solution (M-X-1)** | " | 7–8 |
| cosmetic grade mineral seal oil | " | 13 |
| proprietary saturated oil (M-65)** | " | flowable at 55% |
| proprietary saturated oil (M-65)** | sodium bentonite 2DH* | flowable at 50% |

*available from Ciba Specialty Chemicals
**available from Merlyn Coatings & Chemicals

EXAMPLE 2

Fluidity of High Solids, Non-Aqueous Slurries After Freezing

| FLUIDIZER | BENTONITE | RESULTS OF FREEZING |
|---|---|---|
| water | 7% sodium bentonite | irreversible caking |
| proprietary saturated oil (M-65)** | 15% sodium bentonite | no settling or caking |
| proprietary saturated oil (M-65)** | 50% sodium bentonite | slight settling, but easily re-dispersible |
| proprietary oil (M-65) + 0.5% M-FTS-365** | 50% sodium bentonite | slight settling |

*available from Ciba Specialty Chemicals
**available from Merlyn Coatings and Chemicals The mixtures of bentonites with M65 with or without M-FTS-365 added does not require any special stirring apparatus or agitation procedure. A simple mechanical agitation effects the slurrying of the bentonite in the fluidizing agent.

Although the ability to prepare pumpable bentonite slurries of such a high solids content is new and surprising, one of ordinary skill in the art could well contemplate a number of practical applications for slurries made according to the present invention. Some of these will now be described, but it must not be inferred that the list of applications below is all inclusive:

(i) Mining

It is current practice to use a bentonite barrier to surround a mining operation where there is a concern about groundwater seepage into the pit. As an example, if it were desired to mine the center of an area in which groundwater was an issue, a trench would be constructed about the circumference of the proposed area and bentonite would be placed in the trench. Subsequent contact with the groundwater promotes swelling and the trench acts as a water barrier. A benefit of this approach is that the trench could be left after use without requiring dismantling or removal (as would be the case with "non-dirt" related materials such as cements or other dam materials). This is indicated in FIG. 1. The placement of bentonite in the trench is difficult (as the dry mineral is very light and easily windblown, and the aqueous slurry of greater than 5% solids cumbersome).

(ii) Oil Recovery

Figure 2:
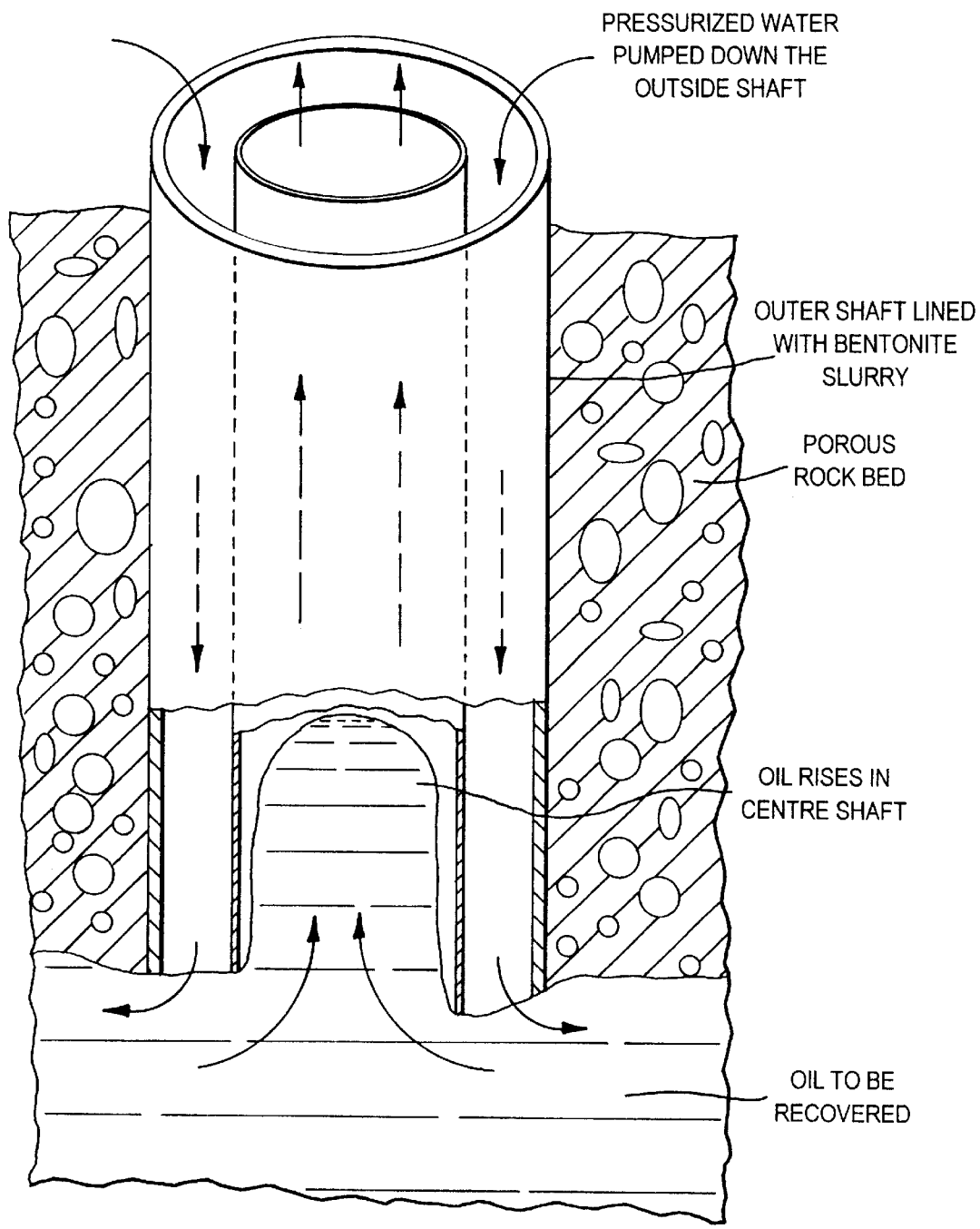

In oil recovery applications it is desirable that water be pumped down a bore-hole permitting the oil to rise to the surface. This is schematically represented in FIG. 2. Most oil recovery is associated with porous substrata and it is necessary to seal these pores of the bore-hole to direct the bulk of the water stream to the oil level rather than having the water pressure diluted by having water channeled off in various other directions. Bentonite, in a fluidizing form is very suitable in this application as it can be readily directed into the borehole, flow along the walls of the porous substrata, and upon subsequent wetting with the stream of pressurized water it will gel in the pores and offer a slick, nonabsorbent surface to the bore-hole. This actually saves not only considerable water losses into the substrata, but also reduces the subterranean water pressure. Upon recovery of the necessary oil, this bentonite layer, unlike artificial materials, need not be removed from the bore-hole and the hole may be sealed without further action.

(iii) Tunneling

Figure 3A:
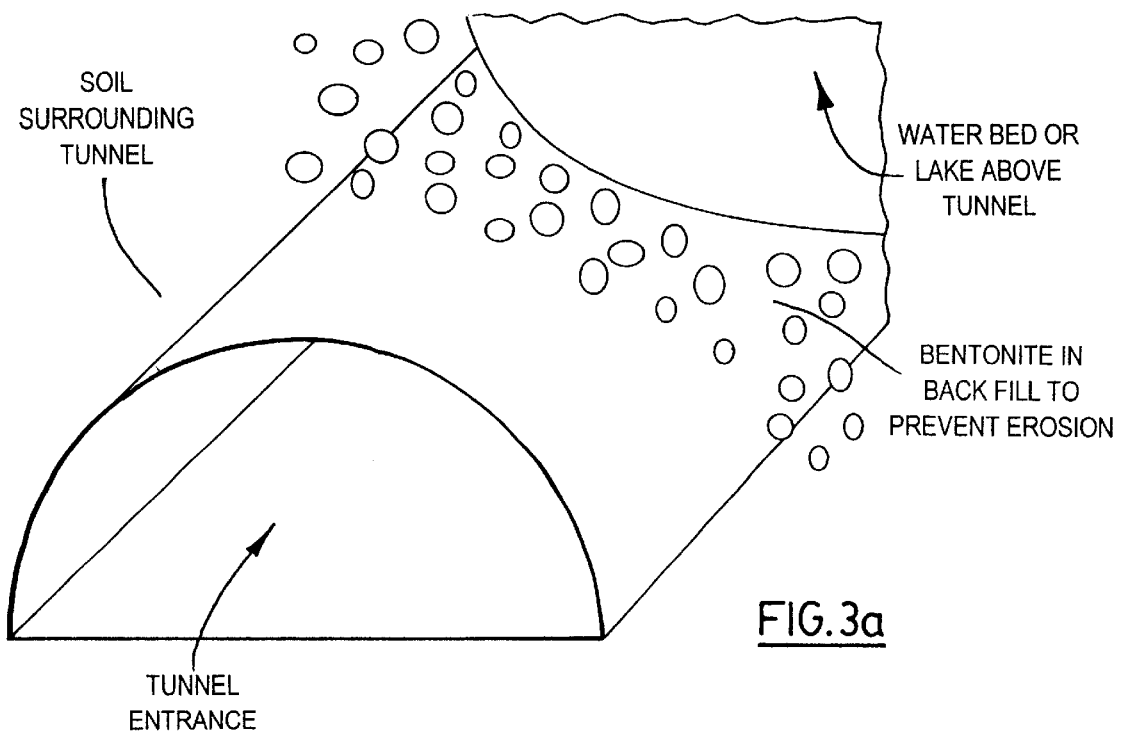
Figure 3B:
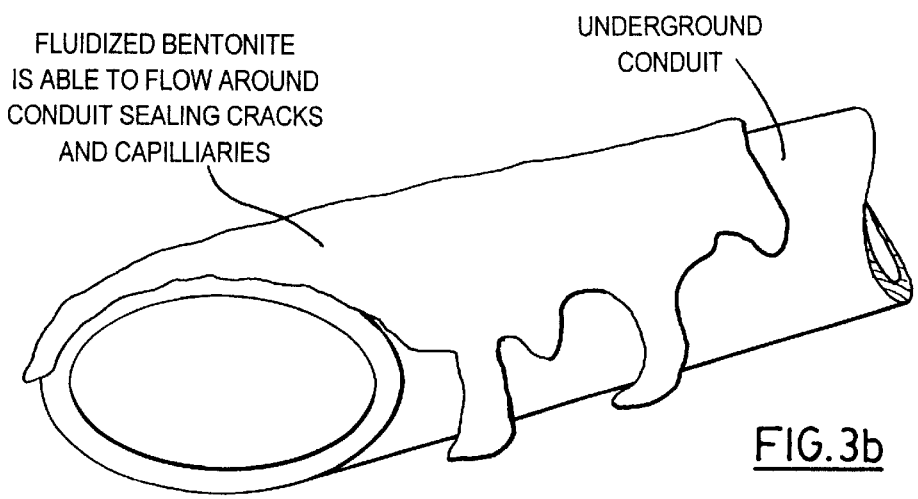

In subway and other tunnel applications, bentonite materials are often used as a soil stabilizer to reduce erosion and soil wash-out potential. A slurry of about 5% bentonite solids is directed into the cavity, or around underground conduits and upon subsequent wetting with water this layer swells and gels and restricts erosion and in some cases leakage from crack and conduits. Two major benefits of using the fluidized bentonite are (a) the water holding capacity of the fluidized bentonite is not impaired (as it is by the presence of the 95% water added with the 5% bentonite in aqueous slurry form), and (b) the higher degree of fluidity of the bentonite used with the fluidizer permits the conduit to be more completely coated as the fluidized bentonite can adhere to the conduit surface and is slick enough to flow around the circumference. This is indicated in FIG. 3.

(iv) Oil Drilling

Because bentonite is slimy when wet it is used to lubricate drill bits during mining and oil recovery. Use of a fluidized bentonite which can activate "at a distance" from the entry port of the drilling cavity permits the lubrication of the bits to be carried out at the drilling interface, as is illustrated substantially in FIG. 4. This has the potential to save energy and materials during the drilling phase.

(v) Paper-Making

Bentonite slurries have the ability to aid in paper-making in a number of ways. It aids in first-pass retention, drainage, removal of "stickies", and significantly improves formation and therefore printing uniformity. Most commonly it is used in conjunction with polymers. In the headbox bentonite is commonly employed at about 0.5% but initial make-up equipment is necessary to make a bentonite concentrate at about 7–10%. The slurries must be constantly agitated to maintain their suspension and the process is both costly and occupies a high space factor. Water uses are tremendous in the preparation of the final 0.5% slurry. Use of the fluidized bentonites should reduce the make-up efforts considerably, will reduce the amount of make-up water used, and will aid in handling of the bentonite in winter situations. Potentially it may also assist in the pre-preparation off-site of the bentonite slurry.

The fluidizing agent used in preparing high-solids bentonite slurries is effective for the purpose by reason of its physicochemical inertness relative to the hydrophilic and reactive surface of the bentonite clays. For that reason, the fluidizing agent is also suitable for a number of materials other than bentonite commonly used as swelling agents in aqueous media such as xanthan gums, polyacrylamides and guar gums.

The examples given in the present application are not to be taken as exhaustive or limiting, the scope of the invention being defind by the claims appended hereto.

What is claimed is:

1. A high-solids, pumpable bentonite slurry, comprising a mixture of:
   (a) a fluidizing agent consisting essentially of one or more hydrocarbon oils exhibiting a degree of saturation of 95% or greater; and
   (b) a bentonite clay wherein a level of solid bentonite in the slurry makes up from 15 to 65% by weight of the total.

2. A bentonite slurry according to claim 1, wherein said fluidizing agent is a liquid hydrocarbon containing from 18 to 23 carbons.

3. A bentonite slurry according to claim 2, wherein said liquid hydrocarbon is a mixture of hydrocarbons containing 15 to 30 carbon atoms and exhibiting a degree of saturation of at least about 95%.

4. A method for preparing a high-solids pumpable bentonite slurry, comprising stirring particulate bentonite clay into a non-aqueous fluidizing agent consisting essentially of hydrocarbon oils of from 15 to 50 carbon atoms per molecule exhibiting degree of saturation of at least about 95%, so that the final bentonite solids content in the slurry is greater than about 50% by weight.

5. A method according to claim 4, wherein said hydrocarbon oils are a mixture of hydrocarbons containing 15 to 30 carbon atoms.

* * * * *